(12) United States Patent
Jonsson (10) Patent No.: US 9,881,275 B2
(45) Date of Patent: Jan. 30, 2018

(54) NETWORK INCLUSION OF A NETWORKED LIGHT BULB

(71) Applicant: Greenwave Systems PTE LTD., Singapore (SG)

(72) Inventor: Karl Jonsson, Rancho Santa Margarita, CA (US)

(73) Assignee: Greenwave Systems, PTE, LTD., Singapore (SG)

( * ) Notice: Subject to any disclaimer, the term of this patent is extended or adjusted under 35 U.S.C. 154(b) by 114 days.

(21) Appl. No.: 14/526,316

(22) Filed: Oct. 28, 2014

(65) Prior Publication Data

US 2015/0048162 A1  Feb. 19, 2015

Related U.S. Application Data

(63) Continuation of application No. 13/155,253, filed on Jun. 7, 2011, now Pat. No. 8,893,968.

(51) Int. Cl.
*G06F 17/00* (2006.01)
*G06Q 10/08* (2012.01)
*H05B 37/02* (2006.01)

(52) U.S. Cl.
CPC ....... *G06Q 10/087* (2013.01); *H05B 37/0245* (2013.01)

(58) Field of Classification Search
CPC ...... G06Q 10/08; G06Q 10/087; G06Q 20/20; G06Q 30/06; H05B 37/0245
See application file for complete search history.

(56) References Cited

U.S. PATENT DOCUMENTS

| 4,918,690 A | 4/1990 | Markkula, Jr. et al. |
| 5,519,878 A | 5/1996 | Dolin, Jr. |
| 5,978,802 A | 11/1999 | Hurvig |

(Continued)

FOREIGN PATENT DOCUMENTS

| KR | 1020090095689 A | 10/2009 |
| WO | 2009029960 A | 3/2009 |
| WO | 2010116299 A | 10/2010 |

OTHER PUBLICATIONS

"Lamp Module Receiver PLMO3 User Manual," X10, Inc. 2008, http://www.x10pro.com/pro/pdf/plm03.pdf retrieved on May 25, 2010.

(Continued)

*Primary Examiner* — Thien M Le
*Assistant Examiner* — April Taylor
(74) *Attorney, Agent, or Firm* — Young's Patent Services, LLC; Bruce A. Young (57) ABSTRACT

A unique identifier may be stored in an RFID chip, a bar code, or other methods of passive storage associated with the networked light bulb. The unique identifier may be accessed while the light bulb is unpowered and before the light bulb is put into service. Information is stored in a database that identifies an association between the unique identifier and a particular network. If the light bulb is put into service, the light bulb may send the unique identifier over the network. A device may receive the unique identifier and query the database for information related to the unique identifier. If the unique identifier is associated with the particular network that the light bulb is connected to, the light bulb may be added as an authorized node on the particular network.

20 Claims, 5 Drawing Sheets

(56) References Cited

U.S. PATENT DOCUMENTS

| | | | |
|---|---|---|---|
| 6,199,204 | B1 | 3/2001 | Donohue |
| 6,389,370 | B1 | 5/2002 | Delaney et al. |
| 6,528,954 | B1 | 3/2003 | Lys et al. |
| 6,675,195 | B1 | 1/2004 | Chatterjee et al. |
| 6,880,010 | B1 | 4/2005 | Webb et al. |
| 7,014,336 | B1 | 3/2006 | Ducharme et al. |
| 7,651,245 | B2 | 1/2010 | Thomas et al. |
| 7,976,461 | B2 | 7/2011 | Ertas et al. |
| 7,987,246 | B2 | 7/2011 | Tsuji et al. |
| 8,055,747 | B2 | 11/2011 | Mazur et al. |
| 8,373,362 | B2 | 2/2013 | Chemel et al. |
| 8,504,702 | B2 | 8/2013 | Diehl et al. |
| 8,519,566 | B2 | 8/2013 | Recker et al. |
| 8,594,976 | B2 | 11/2013 | Dorogi et al. |
| 8,893,968 | B2 | 11/2014 | Jonsson |
| 9,185,783 | B2 * | 11/2015 | Holland ............. H05B 37/0272 |
| 9,451,450 | B2 * | 9/2016 | Fleischman ........... H04W 8/183 |
| 2002/0103765 | A1 | 8/2002 | Ohmori |
| 2002/0173972 | A1 * | 11/2002 | Daniel .................. G06Q 30/02 |
| | | | 705/1.1 |
| 2003/0131150 | A1 | 7/2003 | Sugiura |
| 2004/0066652 | A1 | 4/2004 | Hong |
| 2004/0175078 | A1 | 9/2004 | Imamura |
| 2005/0149487 | A1 | 7/2005 | Celik |
| 2005/0231134 | A1 | 10/2005 | Sid |
| 2006/0005809 | A1 | 1/2006 | Kado et al. |
| 2006/0034234 | A1 * | 2/2006 | Watanabe ........... H04W 76/021 |
| | | | 370/338 |
| 2006/0058009 | A1 | 3/2006 | Vogedes et al. |
| 2006/0284734 | A1 | 12/2006 | Newman |
| 2007/0041340 | A1 | 2/2007 | Binder |
| 2007/0106777 | A1 | 5/2007 | Ishida et al. |
| 2008/0074253 | A1 | 3/2008 | Jeffery |
| 2008/0155069 | A1 | 6/2008 | Kunhappan et al. |
| 2009/0022153 | A1 | 1/2009 | Jain et al. |
| 2009/0031381 | A1 | 1/2009 | Cohen et al. |
| 2009/0105856 | A1 * | 4/2009 | Kurt ..................... H05B 37/029 |
| | | | 700/90 |
| 2009/0150545 | A1 | 6/2009 | Flores et al. |
| 2009/0185505 | A1 | 7/2009 | Ripstein et al. |
| 2009/0207034 | A1 | 8/2009 | Tinaphong et al. |
| 2009/0237006 | A1 | 9/2009 | Champion et al. |
| 2009/0267540 | A1 | 10/2009 | Chemel et al. |
| 2010/0083366 | A1 | 4/2010 | Challener et al. |
| 2010/0088665 | A1 | 4/2010 | Langworthy et al. |
| 2010/0114340 | A1 | 5/2010 | Huizenga et al. |
| 2010/0157981 | A1 | 6/2010 | Dawson |
| 2010/0180016 | A1 | 7/2010 | Bugwadia et al. |
| 2010/0197309 | A1 | 8/2010 | Fang et al. |
| 2010/0281112 | A1 | 11/2010 | Plamondon |
| 2011/0006898 | A1 * | 1/2011 | Kruest .................. H01Q 1/2208 |
| | | | 340/568.1 |
| 2011/0022931 | A1 | 1/2011 | Eleftheriou et al. |
| 2011/0095687 | A1 | 4/2011 | Jonsson |
| 2011/0095709 | A1 | 4/2011 | Diehl et al. |
| 2011/0138377 | A1 | 6/2011 | Allen |
| 2011/0302567 | A1 | 12/2011 | Kobylak et al. |
| 2012/0067754 | A1 | 3/2012 | Holben |
| 2012/0098439 | A1 | 4/2012 | Recker et al. |
| 2012/0201049 | A1 | 8/2012 | Sherman et al. |
| 2012/0254372 | A1 | 10/2012 | Vandendorpe |
| 2012/0317224 | A1 | 12/2012 | Caldwell et al. |
| 2014/0054375 | A1 * | 2/2014 | Smith .................. G06Q 20/202 |
| | | | 235/380 |

OTHER PUBLICATIONS

Ableson, Frank, Using XML and JSON with Android Part 1 Explore the benefits of JSON and XML in Android applications, Aug. 24, 2010, MSI Services Inc. retrieved from http://ibm.com/developerworks/library/x-andbenne1/, pp. 1-5.

Crockford, D., Network Working Group Request for Comments 4627, Jul. 2006, Published by Internet Engineering Task Force, retrieved on Mar. 25, 2011 from http://tools.ietf.org/pdf/rfc4627,pdf.

European Patent Office, Extetnded European Search Report for EP12170107.2, dated Aug. 26, 2013.

Extensible Markup Language (XML) 1.0 (Fifth Edition), edited by Tim Bray et al., Nov. 28, 2008, retrieved on Mar. 25, 2011 from http://www.w3.org/TR/REC-xml/.

USPTO, Notice of Allowance for U.S. Appl. No. 13/072,974, dated Jan. 20, 2014.

Vohra, Manpreet, What are the benefits of using JSON over XML?, Apr. 4, 2010, DeveloperFeed, retrieved from http://www.developerfeed.com/json/faq/what-are-benefits-using-json-over-xml, pp. 1-2.

* cited by examiner

NETWORK INCLUSION OF A NETWORKED LIGHT BULB

CROSS-REFERENCE TO RELATED APPLICATIONS

This application is a continuation of U.S. patent application Ser. No. 13/155,253 filed on Jun. 7, 2011 and entitled "Network Inclusion of a Networked Light Bulb," the entire contents of which are hereby incorporated by reference for any and all purposes.

BACKGROUND

Technical Field

The present subject matter relates to networked homes. If further relates to configuring a home network to accept a particular instance of a networked light bulb.

Description of Related Art

Providing home automation functionality using networking means is well known in the art. Control of lighting and appliances can be accomplished using systems from many different companies such as X10, Insteon® and Echelon. These systems all require some kind of initialization and setup of the devices to communicate properly on the network. In some cases, some of the initialization and setup is pre-defined in the device with no mechanism for the user to easily configure the device for their particular installation. But in many cases, a way for the user to configure the device at the time of installation is required. Light bulbs and light fixtures create a special challenge in that they are often installed in locations that can be hard to reach and people are not used to touching a light bulb, especially when it is on and could be quite hot.

X10 markets a series of home automation control modules such as the PLM03 Lamp Module Receiver. Many X10 modules include two rotary control dials that the user can set at installation to allow each separate module to be independently controlled. One dial is for the "House Code" and can be set to a letter ranging from "A" to "P" while the other dial is for the "Unit Number" which can be set to a number ranging from 1 to 16. Devices with a common "House Code" may be able to communicate with each other, but may not be able to communicate with other devices having a different "House Code" set.

Wi-Fi networks may include security mechanisms such as Wired Equivalent Privacy (WEP), Wi-Fi Protected Access (WPA), and IEEE 802.11i (WPA2) to ensure that only authorized devices may communicate over a particular network. Various configuration schemes may be used to distribute a common key to each authorized device but the most common method is for a user to type a key into each device during a configuration stage.

BRIEF DESCRIPTION OF THE DRAWINGS

The accompanying drawings, which are incorporated in and constitute part of the specification, illustrate various embodiments. Together with the general description, the drawings serve to explain the principles of the invention. They should not, however, be taken to limit the invention to the specific embodiment(s) described, but are for explanation and understanding only. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification.

Because light bulbs are often installed into places such as fixtures on ceilings where it might be very difficult to access a networked light bulb to configure its network connection. Even something as simple as pushing a button on the light bulb while it is installed and powered on may be impossible due to the design of legacy lighting fixtures and the heat generated by the light bulb. It also may not be possible to change the configuration of the light bulb when it is unpowered as the electronics within the light bulb may not be active at that time. Due to the facts mentioned, it may be helpful to have a way of pre-authorizing a networked light bulb to be included into a particular network. Authorizing a device to be included into a network may be referred to by many different names including, but not limited to, including, associating, commissioning and joining.

Reference now is made in detail to the examples illustrated in the accompanying drawings and discussed below.

Figure 1:
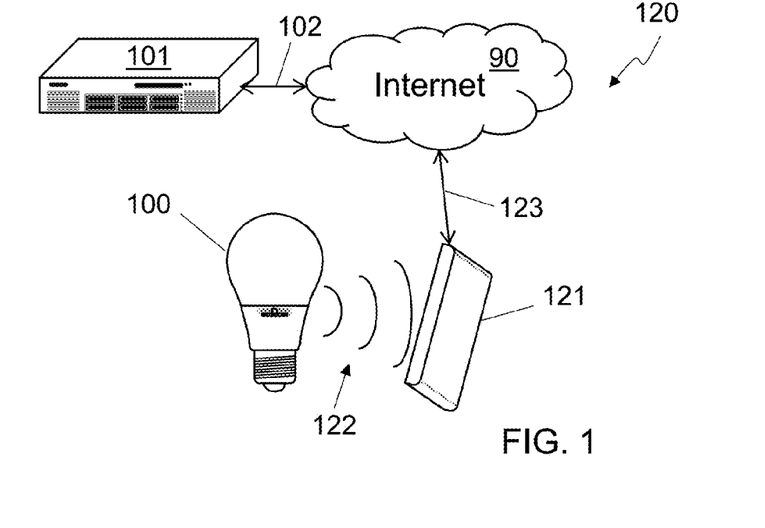
FIG. 1 depicts a system for an embodiment of associating a networked light bulb with a particular network.
Figure 2:
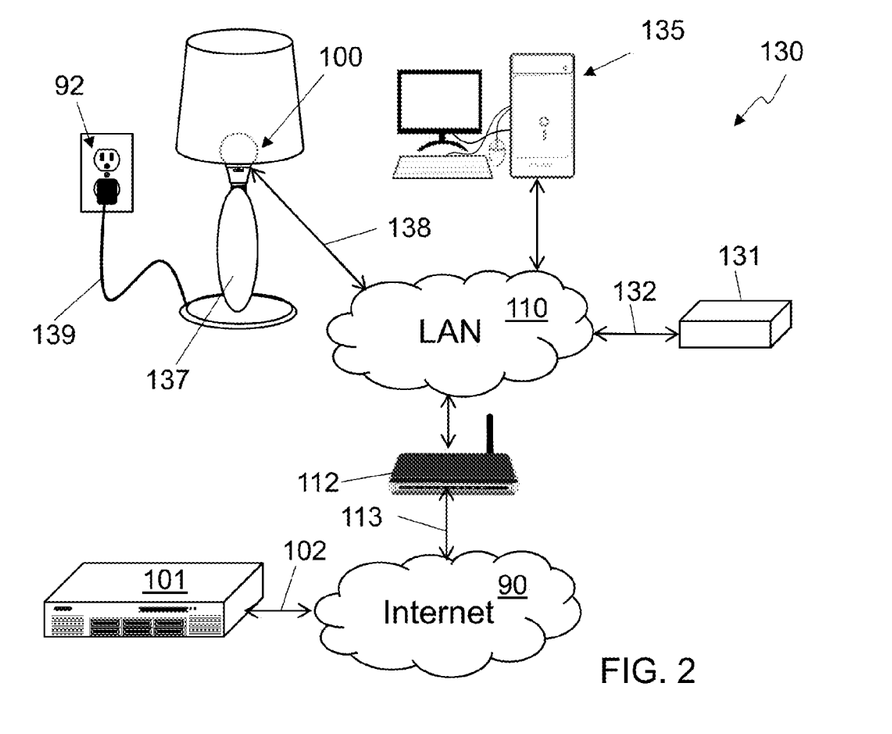
FIG. 2 depicts a system for an embodiment of adding a networked light bulb to a particular network.

FIG. 1 depicts a system 120 for an embodiment of associating a networked light bulb 100 with a particular network 110 and FIG. 2 depicts a complimentary system 130 for an embodiment of adding a networked light bulb 100 to a particular network 110. An electronically readable unique identifier may be included with a networked light bulb 100. The unique identifier may be in any format including, but not limited to, binary, American Standard Code for Information Interchange (ASCII), binary coded decimal (BCD), or other format. The unique identifier may be an electronic version of the serial number of the bulb, a copy of the media access control (MAC) address in the network interface, a unique number for each networked light bulb specifically dedicated for that purpose, or any identifier that is unique for each instance of the networked light bulb 100.

The unique identifier may be stored inside the networked light bulb 100, on the networked light bulb 100, attached to the networked light bulb 100, included in the packaging of the networked light bulb 100, or otherwise associated with the networked light bulb 100, depending on the embodiment. The unique identifier may be stored in such a way that it can be read by a device external to the networked light bulb 100 without requiring the networked light bulb to be powered by any external power source that is capable of powering the lighting element in the networked light bulb 100. The unique identifier may also be read without using the networking circuitry of the networked light bulb 100 and without the unique identifier being sent over the network that the networked light bulb 100 is designed to connect to. In many embodiments the unique identifier may be stored in such a way that no power is required to retain the unique identifier although in some embodiments, a small battery or other power source may be included in the networked light bulb 100 to power the memory device holding the unique identifier.

In some embodiments the unique identifier may be stored in a radio frequency identification (RFID) tag that is included inside the networked light bulb 100, attached to the network light bulb 100, included in the packaging of the network light bulb 100, or otherwise associated with the network light bulb 100. The RFID tag may be read by an RFID reader that may be a stand-alone device or may be embedded in some other device such as a smart phone 121 or a networked device such as a network controller or lighting gateway 131. The RFID reader may provide a burst of radio frequency (RF) energy to the RFID tag that allows the RFID tag to then transmit its contents as a modulated RF signal to the RFID reader. The RF energy that may be directed to the RFID tag during the process of reading the RFID tag should not be considered as power for the networked light bulb 100.

In other embodiments, the unique identifier may be stored as an optically readable symbol such as a bar code, an icon, or text that is printed on the network light bulb 100, and/or the packaging of the network light bulb 100, or otherwise associated with the network light bulb 100. The term "bar code" may refer to any of the many types of bar codes including, but not limited to, linear bar codes and two dimensional (2D) bar codes. Examples of linear bar codes include universal product code (UPC, ISO/IEC 15420), code 93 (ISO/IEC 16388), and code 128 (ISO/IEC 15417) as well as many other standard and proprietary bar codes. Examples of two dimensional bar codes include codablock stacked linear bar codes, quick response (QR) codes, and high capacity color barcode (HCCB) as well as many other standard and proprietary 2D bar codes.

In some embodiment the optically readable symbol may be read by a traditional bar code scanner. In other embodiments the optically readable symbol may be read by creating a picture using a digital image sensor or image scanner and using software to analyze the picture to extract the unique identifier. The software required may depend on the type of optical symbol scanned but in some cases may be standard software designed to read one dimensional or two dimensional bar codes or optical character recognition software. In some embodiments the camera of a smart phone 121 may be used to capture the image of the optically readable symbol. The unique identifier may be extracted from the optically readable symbol by software running on the smart phone 121, a personal computer (PC) 135, a server 101, or other computing device located locally or remotely.

System 120 shows an embodiment using an RFID tag embedded in the networked light bulb 100. A smart phone 121 with an embedded RFID reader may be used to read the unique identifier from the RFID tag in the networked light bulb 100 by receiving the RF energy 122 from the networked light bulb 100 and demodulating the RF energy 122 to extract the unique identifier. The smart phone 121 may then store the unique identifier with an association to a particular network 110 into a database. The database may be any type of electronic system for storing data including a fully relational database, a simple flat file database or any other type of electronic file or set of files. In some embodiments the database may be an electronic file with a list of unique identifiers where the logical storage location, physical storage location, and/or name of the file, identifies the particular network 110.

The database may be stored in any location accessible to the smart phone 121 or other device that may read the unique identifier. In many embodiments the database may be stored on a remote server 101 with an internet connection 102 allowing the database to be accessed over the internet 90. In other embodiments, the database may be stored in a device located on the particular network 110 such as the lighting controller 131 or a PC 135. In some embodiments the smart phone 121 may store the database in its own memory. Some embodiments may store copies of the database in multiple locations. One such embodiment might store the unique identifier in a local copy of the database located on the smart phone 121 that only has entries for unique identifiers associated with a single particular network 110 and then copy the information to a master database located on a remote server 101 containing information about multiple networks. A device associated with a particular network 110, such as lighting gateway 131, may then manage a local copy of a database with unique identifiers associated with its particular network 110 by accessing the master database.

An identifier for a particular network may be determined in various ways for different embodiments. In some embodiments, the particular network may be associated with a particular physical device reading the unique identifier, telephone number of the smart phone 121 reading the unique identifier, MAC address of a network device in communication with the device reading the unique identifier, a physical location where the unique identifier is read, or other attribute. In some embodiments the particular network may be identified during configuration or installation of the software running on the smart phone or other device. In other embodiments a user may be prompted for a particular network to be associated with the particular networked light bulb 100.

In at least one embodiment, the unique identifier may be read by a point-of-sale system at the time that the networked light bulb 100 is purchased. Payment information such as a credit card number, a checking account number, a customer account number, a loyalty card account number, a purchaser name, or other information may be used to determine a particular network 110. Information associating the unique identifier with the particular network 110 may be stored in the database by the point-of-sale system without any further action by the purchaser of the networked light bulb 100. In other embodiments the unique identifier may be accessed at some time after the purchase but before the networked light bulb 100 is put into service to create the database entry for that networked light bulb 100. Once the networked light bulb 100 has had its unique identifier read and stored in the database, the networked light bulb 100 may be stored for an indefinite period of time before being placed into service although in some cases, the networked light bulb 100 may be put into service immediately after its unique identifier is read and stored in the database.

In system 120, after the smart phone 121 reads the unique identifier from the networked light bulb 100 by demodulating the RF energy 122. The smart phone 121 may then store the unique identifier with an association to the particular network 110 into a database located on the remote server 101 over the smart phone's internet connection 123, the internet 90 and the server's internet connection 102. The smart phone's internet connection may depend on the particular smart phone 121 and service provider for the smart phone 121 but may include a 3$^{rd}$ generation or 4$^{th}$ generation data connection to the service provider's network and an internet gateway from the service provider's network to the internet 90. In other embodiments, the smart phone 121 may connect to the particular network 110 and then communicate to the remote server 101 using the internet gateway 112.

Referring now to FIG. 2, the networked light bulb 100 may be put into service at any time after the unique identifier has been accessed and stored into the database as shown in FIG. 1. A system 130 may be used to authorize the inclusion of the networked light bulb 100 in a particular network 110. The particular network 110 may be any type of network, including but not limited to, a wireless mesh network using RF communication such as Z-wave or Zigbee (IEEE 802.15.4), other wireless networks such as Wi-Fi (IEEE 802.11), a power line network such as X10 or HomePlug, a wired network such as Ethernet (IEEE 802.3), an optical network, or any other type of computer network or combination of networks. The particular network 110 may have a variety of devices that are authorized to communicate on the particular network 110 including, but not limited to, a PC 135, a lighting controller 131, an internet gateway 112, other networked light bulbs, networked power strips, and other automated home appliances.

A networked light bulb 100 may be put into service in an environment where access to the particular network 110 may be possible. The networked light bulb 100 may be put into service in any appropriate fixture with a socket capable of accepting and powering the networked light bulb 100 such as the lamp 137. The lamp 137 may include a power cord 139 that may be plugged into a standard wall outlet 92 to provide power to the networked light bulb 100. Other types of lighting fixtures may be directly wired into a structure's wiring. After the networked light bulb 100 is powered up, it may attempt to communicate on the particular network 110 over network connection 138. Because the networked light bulb 100 has not yet been configured, it may send out a request to be configured as a part of the particular network 100. Depending on the network technology used, this request may take different forms. In at least one embodiment, the request to be authorized for the particular network 110 may include the unique identifier of the networked light bulb 100.

A device on the particular network 110, such as lighting controller 131 in this embodiment, although in other embodiments it could be the PC 135 or other device with a responsibility for managing the particular network 110, may receive the request from the networked light bulb 100 to be authorized. The lighting controller 131 may then access the database which may be located in various locations as described above but in this embodiment may be stored on the remote server 101. The lighting controller 131 may access the database by passing a query through its network connection 132 to the network 110 and through the internet gateway 112 and its internet connection 113, though the internet 90 to the remote server 101. The database may use the unique identifier as a key in the database or it may search the database for the unique identifier or other method of finding a record in the database describing any association between the unique identifier and a particular network.

Once the lighting controller 131 receives the information from the database, it may determine whether or not the networked light bulb 100 is associated with the particular network 110. An identifier for the particular network 110 may be determined in various ways for different embodiments. In some embodiments, the particular network may be identified by having all entries in the database that is accessible to the lighting controller be associated with the particular network 110. In other embodiments the MAC address of the lighting controller 131 may be used as the identifier of the particular network 131. In other embodiments, the lighting controller 131 may be configured by having an identifier of the particular network programmed into the lighting controller. Examples of such identifiers that may be pre-programmed include a telephone number, a credit card number, a physical location where the unique identifier is read, or other attribute. In other embodiments a user may be prompted for a particular network to be associated with the particular networked light bulb 100.

If the unique ID received by the lighting controller 131 is associated with the particular network 110, the lighting controller 131 may authorize the networked light bulb 100 to be a node of the particular network 110 allowing the networked light bulb 100 to communicate with other devices on the particular network 110. This may be accomplished by various methods according to the particular network technology used but may include updating tables in the lighting controller 131 to create a list of authorized nodes of the particular network 110 that can be shared with the authorized nodes. Another part of authorization may include providing encryption or security keys to the networked light bulb 100 to allow it to properly encrypt and decrypt messages on the particular network 110. The exact details of how the authorization may be accomplished are network technology specific and should be well understood by one of ordinary skill in the art. Once the networked light bulb 100 has been authorized, various devices, including the lighting controller 131, may be able to control various aspects of the operation of the networked light bulb 100 including the amount of illumination provided by the networked light bulb 100.

Figure 3:
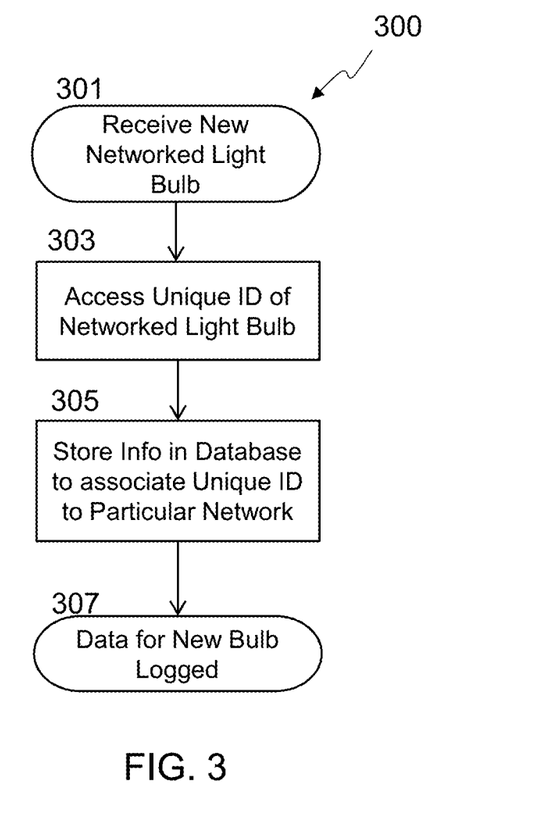
FIG. 3 is a flow chart for an embodiment of associating a networked light bulb with a particular network.

FIG. 3 is a flow chart 300 for an embodiment of associating a networked light bulb 100 with a particular network 110. A new networked light bulb 100 may be received at block 301. The networked light bulb 100 may have been recently purchased, received as a gift, or otherwise acquired. The unique identifier of the networked light bulb 100 may be accessed at block 303. The unique identifier may be accessed while the networked light bulb 100 is unpowered and through a mechanism other than the network interface of the networked light bulb 100. In some embodiments the unique identifier may be stored as an RFID tag and read using an RFID reader. In other embodiments the unique identifier may be stored as a bar code and read using a bar code reader or camera on a mobile phone.

Information that associates the unique identifier with a particular network 110 may be stored in a database at block 305. The particular network 110 may be identified in various ways but in at least one embodiment, the identifier of the particular network may be the phone number of a smart phone 121 that is used to access the unique identifier. The necessary data has been logged at block 307 and the method may end until another networked light bulb is received.

Figure 4:
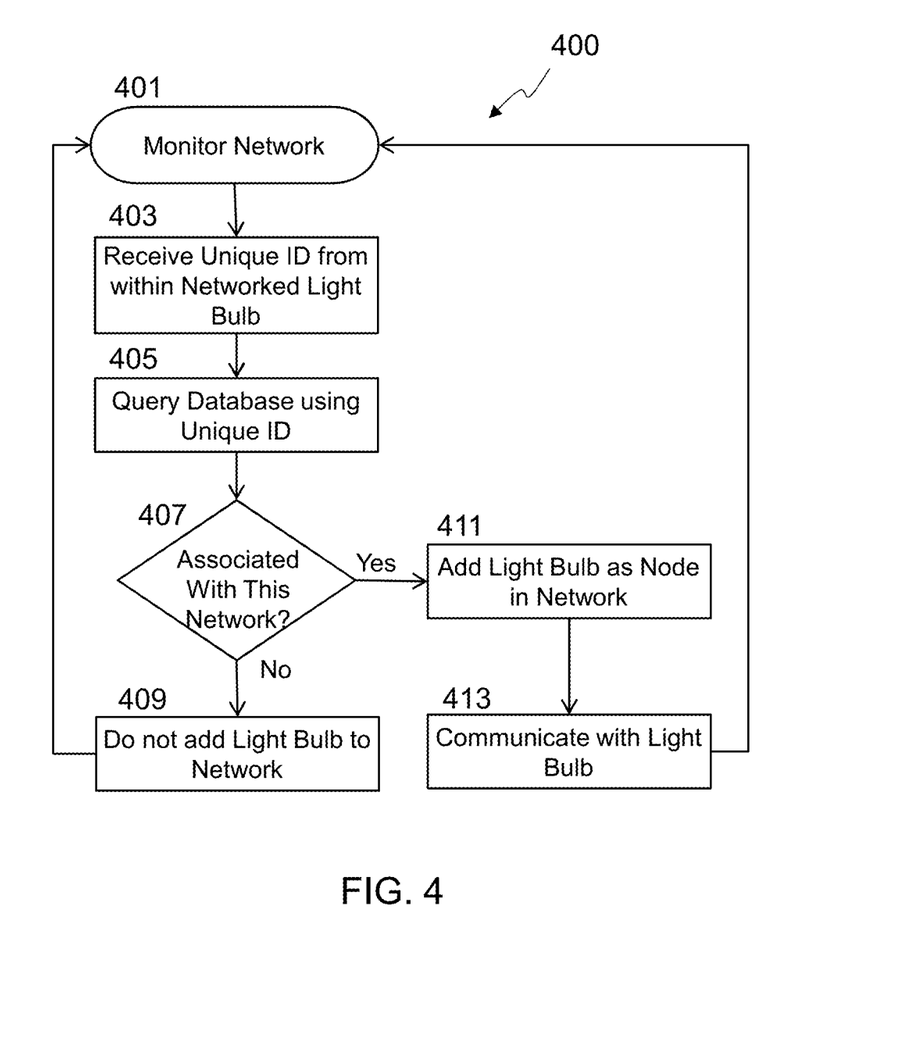
FIG. 4 is a flow chart for an embodiment of adding a networked light bulb to a particular network.

FIG. 4 is a flow chart 400 for an embodiment of adding a networked light bulb 100 to a particular network 110. A device such as the lighting controller 131 may be monitoring the network at block 401. A unique ID from a networked light bulb 100 may be received at block 403 as a part of a request for configuration. The lighting controller 131 may query the database at block 405 using the unique identifier as a key. The lighting controller 131 may then examine the information returned by the database at block 407 to determine if the unique identifier is associated with the particular network 110. The lighting controller 131 may have been previously programmed with the identifier of the particular network, such as the phone number of a smart phone, which may be used to make such a determination. If the unique identifier has not been associated with the particular network, the networked light bulb 100 may be blocked from communication on the particular network 110 at block 409. Depending on the network technology used, this may be accomplished simply by not further configuring the networked light bulb 100. For other network technology a proactive response may be used to block the networked light bulb 100.

If the unique identifier is determined to be associated with the particular network 110 at block 407, the networked light bulb 100 may be added as an authorized node on the particular network 110 at block 411. The way that the networked light bulb 100 may be authorized to communicate on the particular network 110 may depend on the particular network technology used, but in some embodiments may involve updating a table of data in the lighting controller 131 and providing security and/or encryption keys to the networked light bulb 100. After the networked light bulb 100 has been authorized to communicate on the particular network 110, the lighting controller 131 and/or other devices may communicate with the networked light bulb 100 at block 413.

Figure 5:
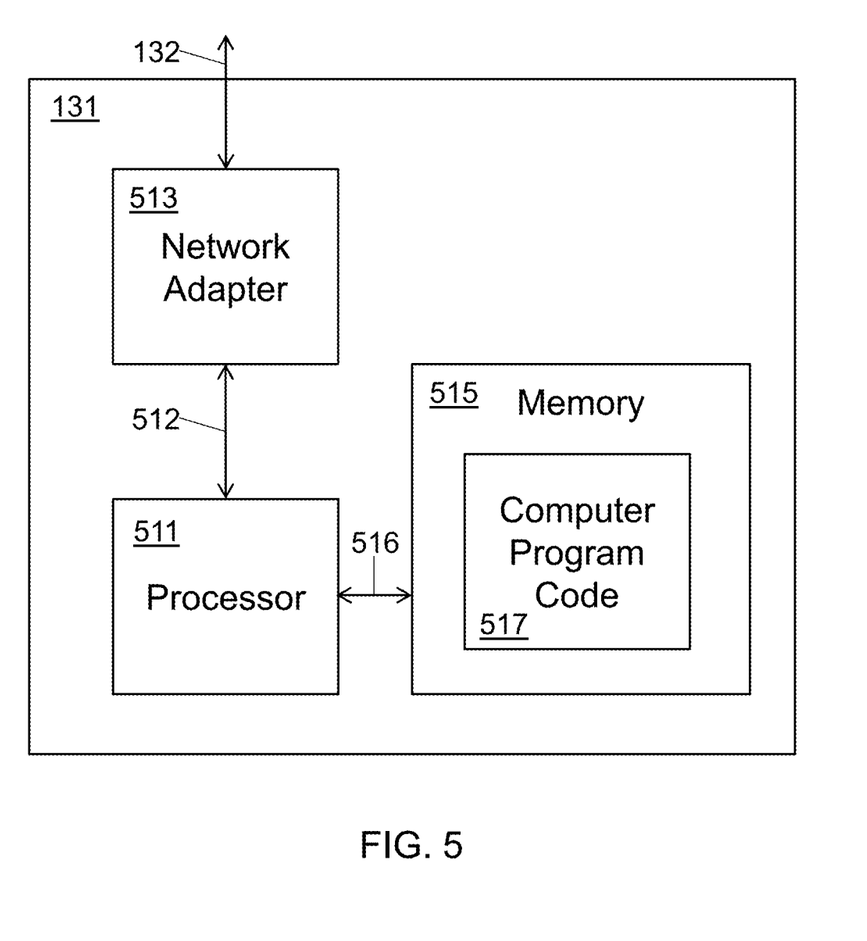
FIG. 5 shows a block diagram of a device suitable for various embodiments.

FIG. 5 shows a block diagram of a lighting gateway 131 although the same block diagram may also apply to a network client, network coordinator, network controller, smart phone, or other device for a various embodiments. The lighting gateway 131 may have a processor 511 capable of executing computer instructions implementing computer programs having various functions. The processor 511 is coupled to a network interface 513 by a communications connection 512, allowing the processor 511 and the network interface 513 to send instructions and/or data to one another. In some embodiments, the processor 511 and the network interface 513 may be integrated onto a single semiconductor die and/or a single package. The network interface 513 has a network connection 132 suitable for connecting to a network. The network interface 513 and network connection 132 may be configured to support any type of computer or telephony network, including wired networks, radio frequency networks, power line communication networks, and optical networks. Wired networks that could be used include, but are not limited to, various speeds and configurations of IEEE 802.3 Ethernet networking, infiniband, Multimedia over Coax Alliance (MoCA), or other standard and/or proprietary protocols. Radio frequency networks that could be used include, but are not limited to, various versions of IEEE 802.11 Wi-Fi, wireless mesh networks such as IEEE 802.15.4 ZigBee or Z-Wave, Global Systems for Mobile Communications (GSM), Code Division Multiple Access 2000 (CDMA2000), other third generation (3G) or fourth generation (4G) mobile telephony standards, IEEE 802.16 WiMax and other "wireless" networks, standards based or proprietary, utilizing radio frequency communication. Power line communication networks that could be used include, but are not limited to, protocols published by the HomePlug Powerline Alliance, the Universal Powerline Association, the HD-PLC Alliance, the ITU-T, or other standards based or proprietary powerline communication protocols. In some embodiments, the networked device 131 may have more than one network interface and network connection, allowing it to communicate over multiple networks that may implement the same or different protocols or types of networking.

The networked device 131 may also include memory 515 or other non-transitory computer readable storage medium coupled to the processor 511 with a communications connection 516. In some embodiments, the processor 511 and the memory 515 may integrated into a single semiconductor die and/or a single package. The memory 515 may be implemented using dynamic random access memory (DRAM) chips, synchronous dynamic random access memory (SDRAM), double data rate random access memory (DDR), NOR or NAND type flash memory chips, static random access memory (SRAM), electrically erasable programmable read only memory (EEPROM), read only memory (ROM), programmable read only memory (PROM), hard disk, CD ROM, DVD ROM, or any other computer readable storage medium, volatile or non-volatile. The memory 515 may hold computer program code 517 that is readable and executable by the processor 511. The computer program code 517 may be configured to implement the methods described above including the method shown in flow chart 300 in FIG. 3 and/or flow chart 400 in FIG. 4.

Figure 6:
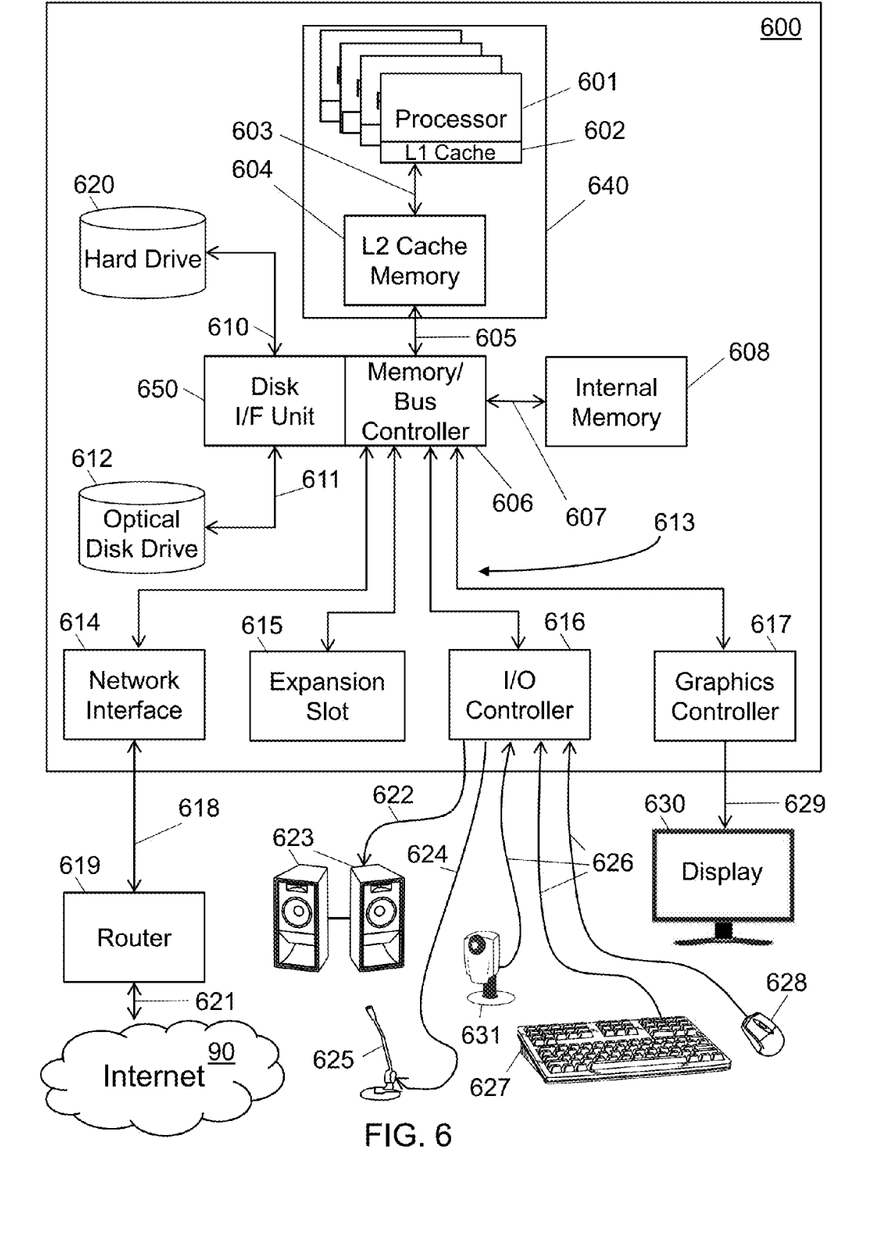
FIG. 6 shows a block diagram of a computer suitable for various embodiments.

FIG. 6 depicts details of a computer system 600 suitable for implementing various embodiments of the server 101, PC 135 or devices suitable for implementing various embodiments such as that shown in flow chart 300 in FIG. 3 and or flow chart 400 in FIG. 4. The computer system 600 may be configured in the form of a desktop computer, a laptop computer, a mainframe computer, or any other hardware or logic arrangement capable of being programmed or configured to carry out instructions. In some embodiments the computer system 600 may act as a server, accepting inputs from a remote user over a local area network (LAN) 618 or the internet 90. In other embodiments, the computer system 600 may function as a smart user interface device for a server on a LAN 618 or over the internet 90. The computer system 600 may be located and interconnected in one location, or may be distributed in various locations and interconnected via communication links such as a LAN 618 or a wide area network (WAN), via the Internet 90, via the public switched telephone network (PSTN), a switching network, a cellular telephone network, a wireless link, or other such communication links. Other devices may also be suitable for implementing or practicing the embodiments, or a portion of the embodiments. Such devices include personal digital assistants (PDA), wireless handsets (e.g., a cellular telephone or pager), and other such electronic devices preferably capable of being programmed to carry out instructions or routines. One skilled in the art may recognize that many different architectures may be suitable for the computer system 600, but only one typical architecture is depicted in FIG. 6.

Computer system 600 may include a processor 601 which may be embodied as a microprocessor, two or more parallel processors, a central processing unit (CPU) or other such control logic or circuitry. The processor 601 may be configured to access a local cache memory 602, and send requests for data that are not found in the local cache memory 602 across a cache bus 603 to a second level cache memory 604. Some embodiments may integrate the processor 601, and the local cache 602 onto a single integrated circuit and other embodiments may utilize a single level cache memory or no cache memory at all. Other embodiments may integrate multiple processors 601 onto a single die and/or into a single package. Yet other embodiments may integrate multiple processors 601 with multiple local cache memories 602 with a second level cache memory 604 into a single package 640 with a front side bus 605 to communicate to a memory/bus controller 606. The memory/bus controller 606 may accept accesses from the processor(s) 601 and direct them to either the internal memory 608 over memory bus 607 or to the various input/output (I/O) busses 610, 611, 613. A disk interface unit 650 may connect to the communication link 610 to the hard disk drive 620 and/or or other communication link 611 to the optical disks 612 and may be integrated into the memory/bus controller 606 or may be a separate chip. Some embodiments of the computer system 600 may include multiple processor packages 640 sharing the front-side bus 605 to the memory/bus controller. Other embodiments may have multiple processor packages 640 with independent front-side bus connections to the memory/bus controller 606. The memory bus controller 606 may communicate with the internal memory 608 using a memory bus 607. The internal memory 608 may include one or more of random access memory (RAM) devices such as synchronous dynamic random access memories (SDRAM), double data rate (DDR) memories, or other volatile random access memories. The internal memory 608 may also include non-volatile memories such as electrically erasable/ programmable read-only memory (EEPROM), NAND flash memory, NOR flash memory, programmable read-only memory (PROM), read-only memory (ROM), battery backed-up RAM, or other non-volatile memories. The various memory devices may be embodiments of a non-transitory computer readable storage medium suitable for storing computer program code and/or data. In some embodiments, the computer system 600 may also include 3rd level cache memory or a combination of these or other like types of circuitry configured to store information in a retrievable format. In some implementations the internal memory 608 may be configured as part of the processor 601, or alternatively, may be configured separate from it but within the same package 640. The processor 601 may be able to access internal memory 608 via a different bus or control lines than is used to access the other components of computer system 600.

The computer system 600 may also include, or have access to, one or more hard disk drives 620 (or other types of storage memory) and optical disk drives 612. Hard disk drives 620 and the optical disks for optical disk drives 612 are examples of non-transitory machine readable (also called computer readable) mediums suitable for storing computer program code and/or data. The optical disk drives 612 may include a combination of several disc drives of various formats that can read and/or write to removable storage media (e.g., CD-R, CD-RW, DVD, DVD-R, DVD-W, DVD-RW, HD-DVD, Blu-Ray, and the like). Other forms or computer readable media that may be included in some embodiments of computer system 600 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable storage medium. The computer system 600 may either include the hard disk drives 620 and optical disk drives 612 as an integral part of the computer system 600 (e.g., within the same cabinet or enclosure and/or using the same power supply), as connected peripherals, or may access the hard disk drives 620 and optical disk drives 612 over a network, or a combination of these. The hard disk drive 620 often includes a rotating magnetic medium configured for the storage and retrieval of data, computer programs or other information. The hard disk drive 620 also often includes a disk controller capable of controlling the motor to rotate the storage medium as well as access the data on the medium. In some embodiments, an additional drive may be a solid state drive using semiconductor memories. In other embodiments, some other type of computer useable medium may be used. The hard disk drive 620 need not necessarily be contained within the computer system 600. For example, in some embodiments the hard disk drive 620 may be server storage space within a network that is accessible to the computer system 600 for the storage and retrieval of data, computer programs or other information. In some instances the computer system 600 may use storage space at a server storage farm, or like type of storage facility, that is accessible by the Internet 90 or other communications lines. The hard disk drive 620 is often used to store the software, instructions and programs executed by the computer system 600, including for example, all or parts of the computer application program for carrying out activities of the various embodiments.

The disk interface 610 and/or communication link 611 may be used to access the contents of the hard disk drives 620 and optical disk drives 612. These interfaces/links 610, 611 may be point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium.

The memory/bus controller may also provide other I/O communication links 613. In some embodiments, the links 613 may be a shared bus architecture such as peripheral component interface (PCI), microchannel, industry standard architecture (ISA) bus, extended industry standard architecture (EISA) bus, VERSAmodule Eurocard (VME) bus, or any other shared computer bus. In other embodiments, the links 613 may be a point-to-point link such as PCI-Express, HyperTransport, or any other point-to-point I/O link. Various I/O devices may be configured as a part of the computer system 600. In many embodiments, a network interface 614 may be included to allow the computer system 600 to connect to a network 618. The network 618 may be an IEEE 802.3 Ethernet network, an IEEE 802.11 Wi-Fi wireless network, or any other type of computer network including, but not limited to, LANs, WAN, personal area networks (PAN), wired networks, radio frequency networks, powerline networks, and optical networks. A router 619 or network gateway, which may be a separate component from the computer system 600 or may be included as an integral part of the computer system 600, may be connected to the network 618 to allow the computer system 600 to communicate with the internet 90 over an internet connection 621 such as an asymmetric digital subscriber line (ADSL), data over cable service interface specification (DOCSIS) link, T1 or other internet connection mechanism. In other embodiments, the computer system 600 may have a direct connection to the internet 90. In some embodiments, an expansion slot 615 may be included to allow a user to add additional functionality to the computer system 600.

The computer system 600 may include an I/O controller 616 providing access to external communication interfaces such as universal serial bus (USB) connections 626, serial ports such as RS-232, parallel ports, audio in 624 and audio out 622 connections, the high performance serial bus IEEE-1394 and/or other communication links. These connections may also have separate circuitry in some embodiments, or may be connected through a bridge to another computer communication link provided by the I/O controller 616. A graphics controller 617 may also be provided to allow applications running on the processor 601 to display information to a user. The graphics controller 617 may output video through a video port 629 that may utilize a standard or proprietary format such as an analog video graphic array (VGA) connection, a digital video interface (DVI), a digital high definition multimedia interface (HDMI) connection, or any other video interface. The video connection 629 may connect to display 630 to present the video information to the user. The display 630 may be any of several types of displays, including a liquid crystal display (LCD), a cathode ray tube (CRT) monitor, on organic light emitting diode (OLED) array, or other type of display suitable for displaying information for the user. The display 630 may include one or more light emitting diode (LED) indicator lights, or other such display devices. Typically, the computer system 600 includes one or more user input/output (I/O) devices such as a keyboard 627, mouse 628, and/or other means of controlling the cursor represented including but not limited to a touchscreen, touchpad, joystick, trackball, tablet, or other device. The user I/O devices may connect to the computer system 600 using USB 626 interfaces or other connections such as RS-232, PS/2 connector or other interfaces. Some embodiments may include a webcam 631 which may connect using USB 626, a microphone 625 connected to an audio input connection 624 and/or speakers 623 connected to an audio output connection 622. The keyboard 627 and mouse 628, speakers 623, microphone 625, webcam 631, and monitor 630 may be used in various combinations, or separately, as means for presenting information to the user and/or receiving information and other inputs from a user to be used in carrying out various programs and calculations. Speech recognition software may be used in conjunction with the microphone 625 to receive and interpret user speech commands.

The computer system 600 may be suitable for embodiments of the server 101 or the PC 135 and may store computer program code for executing the methods shown on flowchart 300 in FIG. 3 and/or flowchart 400 in FIG. 4. In some embodiments, a computer system 600 may store compute program code on its computer readable storage medium that is designed to be executed on a processor that is different than the processor 601, such as in the example of a firmware update service running on a computer system 600 acting as a software update server.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "server," "circuit," "module," "lighting gateway," "logic" or "system." Furthermore, aspects of the various embodiments may take the form of a computer program product embodied in one or more computer readable medium(s) having computer readable program code stored thereon.

Any combination of one or more computer readable storage medium(s) may be utilized. A computer readable storage medium may be embodied as, for example, an electronic, magnetic, optical, electromagnetic, infrared, or semiconductor system, apparatus, or device, or other like storage devices known to those of ordinary skill in the art, or any suitable combination of computer readable storage mediums described herein. In the context of this document, a computer readable storage medium may be any tangible medium that can contain, or store a program and/or data for use by or in connection with an instruction execution system, apparatus, or device.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used in this specification and the appended claims, the singular forms "a", "an", and "the" include plural referents unless the content clearly dictates otherwise. Thus, for example, reference to an element described as "a device" may refer to a single device, two devices or any other number of devices. As used in this specification and the appended claims, the term "or" is generally employed in its sense including "and/or" unless the content clearly dictates otherwise.

As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, ¶6. In particular the use of "step of" in the claims is not intended to invoke the provision of 35 U.S.C. §112, ¶6.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A method of associating a networked light bulb with a particular network, the method comprising:
    retrieving a unique identifier from a networked light bulb with an electronic reader at a point-of-sale system while the networked light bulb is unpowered;
    collecting payment information at the point-of-sale system; and
    communicating authorization information from the point-of-sale system to a database, the database located on a remote server and accessible to a device associated with the particular network, that authorizes the networked light bulb to communicate over the particular network, the authorization information comprising the unique identifier and payment information.

2. The method of claim 1, wherein the payment information comprises a loyalty card account number.

3. The method of claim 1, wherein the retrieving the unique identifier comprises accessing an RFID tag associated with the networked light bulb.

4. The method of claim 3, wherein the RFID tag is included inside the networked light bulb.

5. The method of claim 1, wherein the retrieving the unique identifier comprises scanning a bar code associated with the networked light bulb.

6. The method of claim 5, wherein the bar code is located on a package containing the networked light bulb.

7. The method of claim 1, further comprising:
    receiving the unique identifier of the networked light bulb over the particular network;
    querying the database for the authorization information related to the unique identifier received from the networked light bulb; and
    adding the networked light bulb as an authorized node on the particular network if the authorization information received from the database identifies the particular network.

8. The method of claim 1, wherein the payment information is associated with the particular network.

9. A point-of-sale system comprising:
    a processor;
    a memory coupled to the processor; and
    an electronic reader coupled to the processor;
    wherein the processor is configured to:
    retrieve a unique identifier from an unpowered networked device with the electronic reader;
    collect payment information at a time of sale of the networked device;
    communicate information to a database, on a remote server accessible to a device associated with a particular local-area network associated with the payment information, that authorizes the networked device to communicate over the particular local-area network;
    wherein the unique identifier comprises a media access control (MAC) address associated with a network interface for the particular local-area network in the networked device.

10. The system of claim 9, wherein the networked device is a networked light bulb.

11. The system of claim 9, wherein the payment information comprises a loyalty card account number.

12. The system of claim 9, wherein the payment information is selected from a group consisting of a credit card number, a checking account number, a customer account number, and a purchaser name.

13. The system of claim 9, wherein the electronic reader comprises an RFID reader.

14. The system of claim 9, wherein the electronic reader comprises a bar code scanner.

15. A computer program product for associating a networked device with a particular local-area network, the computer program product comprising:
    a non-transitory computer readable storage medium having computer readable program code embodied therewith, the computer readable program code comprising:
    computer readable program code configured to retrieve a unique identifier from a bar code or an RFID tag associated with the networked device; and
    computer readable program code configured to communicate authorization information, associated with the unique identifier, to a database accessible by a controller of the particular local-area network, to authorize the networked device associated with the unique identifier to communicate over the particular local-area network;
    wherein the unique identifier comprises a media access control (MAC) address associated with a network interface for the particular local-area network in the networked device.

16. The computer program product of claim 15, further comprising:
    computer readable program code configured to collect payment information at a point-of-sale of the networked device;
    wherein the particular local-area network is identified by the payment information, and the database is located on a remote server.

17. The computer program product of claim 16, wherein the payment information comprises a loyalty card account number.

18. The computer program product of claim 15, further comprising:
   computer readable program code configured to determine an identifier for the particular local-area network to associate with the authorization information;
   wherein the computer readable program code is targeted to execute on a smartphone.

19. The computer program product of claim 15, further comprising:
   computer readable program code configured to receive the unique identifier of the networked device over the particular local-area network;
   computer readable program code configured to query the database to receive the authorization information; and
   computer readable program code configured to add the networked device as an authorized node on the particular local-area network if the authorization information received is associated with the unique identifier and identifies the particular local-area network;
   wherein the computer readable program code is targeted to execute on a network controller for the particular local-area network.

20. The computer program product of claim 15, wherein the networked device is a networked light bulb.

* * * * *